United States Patent
Post et al.

(10) Patent No.: US 9,286,500 B1
(45) Date of Patent: Mar. 15, 2016

(54) CARD READER COMMUNICATION METHOD

(71) Applicant: Square, Inc., San Francisco, CA (US)

(72) Inventors: Daniel Jeffrey Post, San Mateo, CA (US); Thomas Templeton, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 87 days.

(21) Appl. No.: 13/841,689

(22) Filed: Mar. 15, 2013

(51) Int. Cl.
*G06K 7/14* (2006.01)

(52) U.S. Cl.
CPC .................................. *G06K 7/14* (2013.01)

(58) Field of Classification Search
CPC ............................ G06K 7/1097; H04B 10/807
USPC ............................ 398/171; 235/449, 380, 462
See application file for complete search history.

(56) References Cited

U.S. PATENT DOCUMENTS

| | | | | |
|---|---|---|---|---|
| 5,241,161 A * | 8/1993 | Zuta | ....................... | G04G 21/00 235/382 |
| 5,789,733 A * | 8/1998 | Jachimowicz | ....... | G06K 7/1097 235/380 |
| 7,040,534 B2 * | 5/2006 | Turocy | ................ | G06Q 20/1085 235/379 |
| 7,810,729 B2 * | 10/2010 | Morley, Jr. | ............. | G06K 7/083 235/435 |
| 8,128,002 B2 | 3/2012 | McCallum et al. | | |
| 2001/0015377 A1 * | 8/2001 | Vassura | .............. | G06K 7/10881 235/454 |
| 2004/0099746 A1 * | 5/2004 | Norton | ................. | G06K 7/1097 235/492 |
| 2005/0247787 A1 * | 11/2005 | Von Mueller | .......... | G06K 7/084 235/449 |
| 2014/0016945 A1 * | 1/2014 | Pan | .................... | H04B 10/1143 398/171 |

OTHER PUBLICATIONS

Tobias Hesselmann,FlashLight: Optical Communication between Mobile Phones and Interactive Tabletops,Nov. 7-10, 2010, Saarbrucken, Germany,ITS 2010: Interactions,pp. 135-138 or pp. 1-4 ( PDF page #).*

* cited by examiner

*Primary Examiner* — David Payne
*Assistant Examiner* — Omar S Ismail
(74) *Attorney, Agent, or Firm* — Novak Druce Connolly Bove + Quigg LLP

(57) ABSTRACT

A card reader includes a body, the body being configured for coupling with a device, the device including a device light sensor and a device light source; a reader light sensor that is configured to capture light being emitted from the device light source, wherein, when the body is coupled to the user device, the reader light sensor is positioned adjacent to the device light source; a reader light source that is configured to emit light to the device light sensor, wherein, when the body is coupled to the user device, the reader light source is positioned adjacent to the device light sensor; a reader interface positioned in the body and configured to read the card; and circuitry configured to communicate data between the card reader and the user device using the reader light sensor and the reader light source.

20 Claims, 3 Drawing Sheets

CARD READER COMMUNICATION METHOD

TECHNICAL FIELD

This disclosure relates to a card reader.

BACKGROUND

Electronic devices, such as mobile phones, can include external connectors for interfacing with peripherals. One type of external connector is an audio jack, e.g., an audio socket. For example, the audio jack of a mobile device can be coupled with an audio plug of a credit card reader. Once coupled, the mobile device and the card reader can communicate data with one another by transmitting and receiving electrical signals through the audio plug. Other types of external connectors include USB ports and 30-pin connectors. Some electronic devices include wireless communication interfaces, e.g., wireless LAN and Bluetooth.

SUMMARY

In one aspect, a card reader includes a body, the body being configured for coupling with a device, the device including a device light sensor and a device light source; a reader light sensor that is configured to capture light being emitted from the device light source, wherein, when the body is coupled to the user device, the reader light sensor is positioned adjacent to the device light source; a reader light source that is configured to emit light to the device light sensor, wherein, when the body is coupled to the user device, the reader light source is positioned adjacent to the device light sensor; a reader interface positioned in the body and configured to read a magnetic stripe on the card as the card is swiped through the first slot along the first axis; and circuitry configured to communicate data between the card reader and the user device using the reader light sensor and the reader light source.

Implementations can include one or more of the following. The device light sensor is an ambient light sensor or a camera. The reader light sensor is an ambient light sensor or a camera. The reader light source is a light emitting diode or a flash. The body is coupled to the user device using a clip.

In one aspect, a method for transmitting data from a reader to a device includes generating, using the reader, an optical signal that describes data; transmitting, using a reader light source on the reader, the optical signal to a device light sensor on the device; receiving, using the device light sensor, the transmitted optical signal at the device; decoding, using the device, the optical signal into digital data; and processing a financial transaction using the digital data. Other implementations of this aspect include corresponding computer systems, apparatus, and computer programs recorded on one or more computer storage devices, each configured to perform the actions of the methods.

Implementations can include one or more of the following. The method further includes calibrating the reader with the device. The reader is a card reader and the data includes data obtained from reading a card using the card reader, and wherein the digital data describes the data obtained from the card.

In one aspect, a method for transmitting data from a device to a reader includes generating, using the device, an optical signal that describes data; transmitting, using a device light source on the device, the optical signal to a reader light sensor on the reader; receiving, using the reader light sensor, the transmitted optical signal at the reader; decoding, using the reader, the optical signal into digital data. Other implementations of this aspect include corresponding computer systems, apparatus, and computer programs recorded on one or more computer storage devices, each configured to perform the actions of the methods.

Implementations can include one or more of the following. The method further includes calibrating the reader with the device.

Advantages may include one or more of the following. Data can be transmitted from a card reader to a device using optical signals. Data can be transmitted from a card reader to a device without an audio jack. Data can be transmitted using optical signals and, as a result, may be subject to fewer filters than transmitting the data using an audio jack. Having fewer filters can allow encoding of the data using amplitude, which can increase system bandwidth.

BRIEF DESCRIPTION OF THE DRAWINGS

Like reference numbers and designations in the various drawings indicate like elements.

DETAILED DESCRIPTION

Figure 1B:
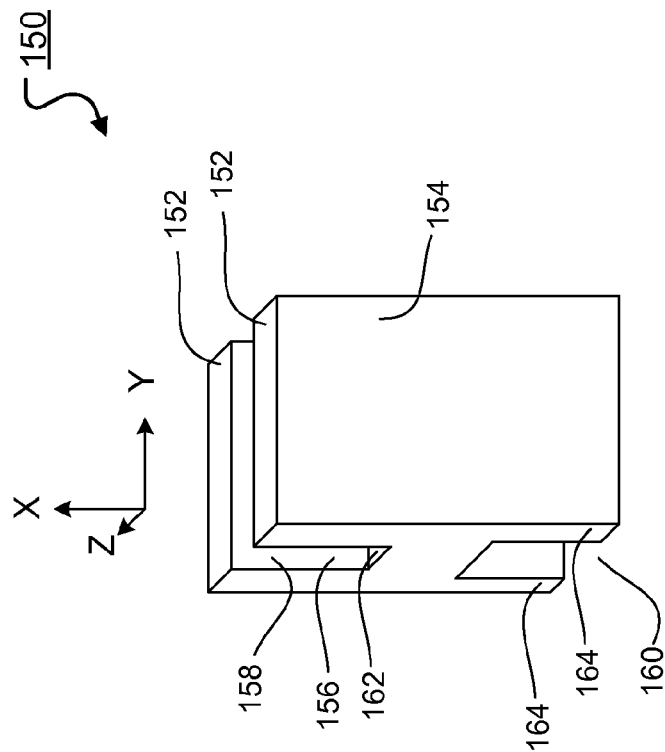
FIG. 1B is a schematic perspective view of an example card reader.
Figure 1A:
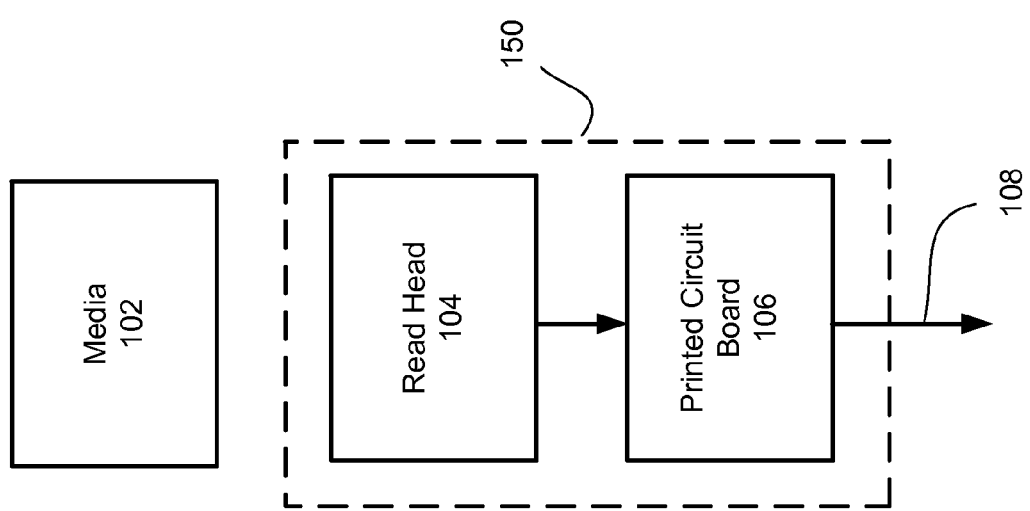
FIG. 1A is a block diagram of an example architecture for a system using a read head.

FIG. 1A is a block diagram of an example architecture for a system using a read head 104. For example, the read head 104 can be a magnetic read head that reads magnetic signals from magnetic media, a near field reader, or a chip card reader. The system can include media 102, the read head 104, and a printed circuit board 106. Circuitry on the printed circuit board 106, e.g., an application specific integrated circuit (ASIC) or a programmed microprocessor, can process the signals received from the read head 104 and perform operations based on the signals, and generate an output on an output terminal 108. For example, the circuitry on the printed circuit board 106 can determine, from the electrical signals, a digital output that describes, for example, alphanumeric values that represent data (e.g., a credit card number) stored in the stripe. The read head 104 and printed circuit board 106 are typically packaged together in a card reader 150.

In some implementations, once the digital output is determined, the card reader 150 encodes the digital output into an optical signal and transmits the optical signal to another device. Depending on the implementation, the card reader 150 can be configured to transmit the optical signal using visible light or infrared light. A device that is configured to receive the optical signal can receive and decode the optical signal to obtain the digital output.

In more detail, the circuitry on the printed circuit board 106 can be configured to encode the digital output into an optical signal using conventional modulation techniques including, for example, Manchester encoding or Quadrature phase-shift keying (QPSK) encoding. The circuitry can also be configured to provide the optical signal to a reader light source (e.g., a flash or a light emitting diode) on the card reader 150. The reader light source can then transmit the optical signal, for example, as pulses of light, to another device.

In some implementations, the card reader 150 is configured to receive and decode an optical signal, received from a device, to a digital signal. A device can transmit an optical signal to the card reader 150, for example, to provide the card reader 150 with an instruction or a notification. Depending on the implementation, the card reader 150 can be configured to receive the optical signal using visible light or infrared light.

In more detail, the card reader 150 can receive the optical signal using a reader light sensor on the card reader 150. Once received, the circuitry on the printed circuit board 106 can be configured to decode the optical signal to a digital output by demodulating conventional modulation techniques, for example, Manchester encoding or Quadrature phase-shift keying (QPSK) encoding, that were used to produce the optical signal.

In more detail, the card reader 150 can include a link layer that is configured to construct and transmit a preamble, generating synchronization patterns, encoding data into optical signals using forward error correction techniques (e.g., to generate ECC-encoded data), and transmit data according to the sync pattern.

FIG. 1B is a schematic perspective view of a card reader 150. The card reader 150 includes a body 154 that encapsulates a read head. The body 154 of the card reader 150 also includes a first slot 156; the first slot can be defined by a space between parallel first and second side wall 152 and closed off at the bottom by a bottom surface 162 extending between the side walls 152. The slot 156 can be open on near and far ends of the side walls 152. A card can be swiped through the slot 156 in the body 154. The read head can be positioned on the interior surface 158 of one of the side walls (see FIG. 2).

In some implementations, the body 154 of the card reader 150 also includes a second slot 160; the second slot 160 can be defined by a space between parallel first and second side wall 164 and closed off at the bottom by a bottom surface extending between the side walls 164. The slot 160 can be open on near and far ends of the side walls 164. In some implementations, the second slot 160 includes a reader light source and a reader light sensor for use in respectively transmitting and receiving optical signals, as described below in reference to FIG. 2.

Figure 2:
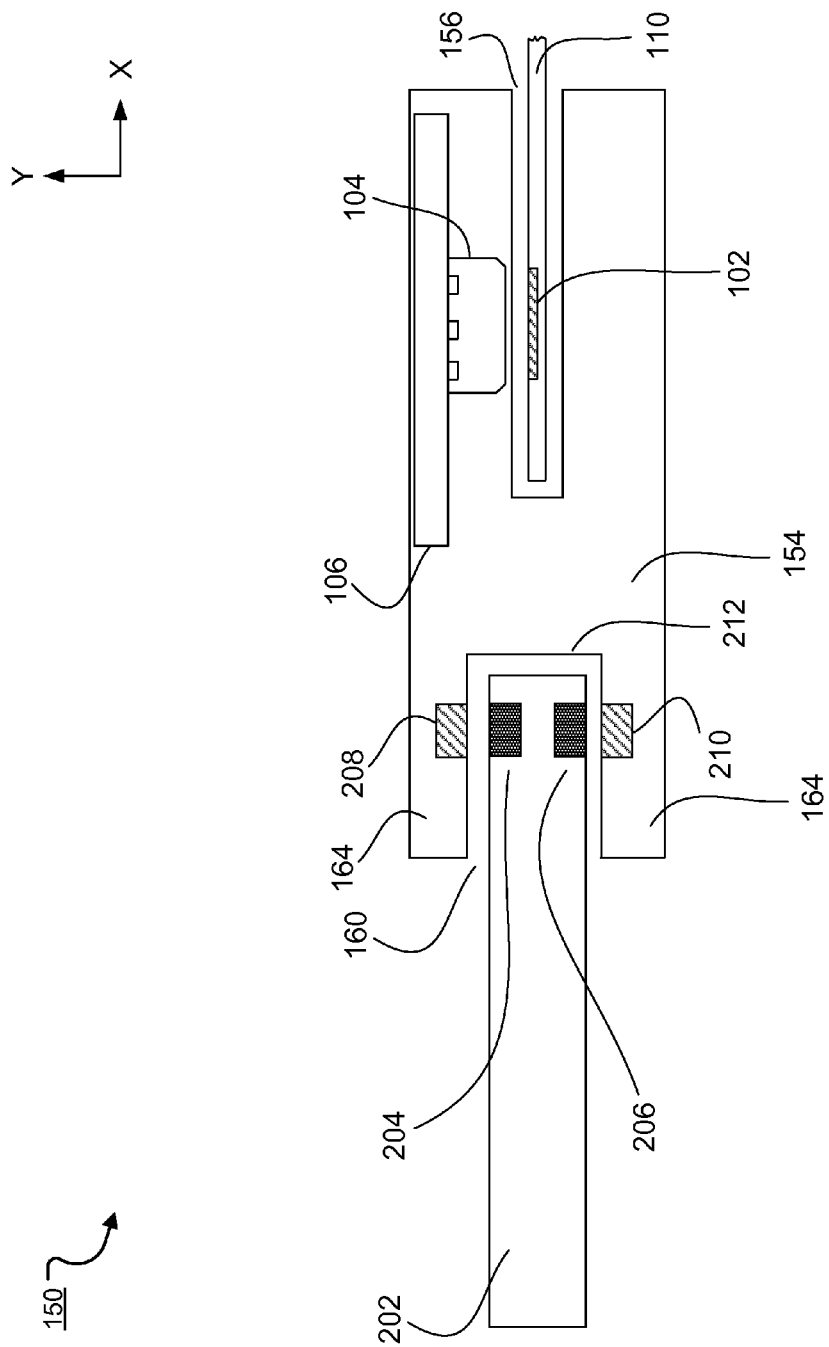
FIG. 2 is a side view of a read head in an example card reader with a card being swiped.

FIG. 2 is a side view of a read head 104 in the card reader 150 with a card 110 being swiped. The card reader 150 can include a body 154 that encapsulates a read head 104.

The card reader 150 also includes a second slot 160 of the body 154. The second slot 160 can be defined by a space between parallel first and second side wall 164 and closed off at the bottom by a bottom surface 212 extending between the side walls 164. The slot 160 can be open on near and far ends of the side walls 164.

The second slot 160 includes a reader light source 208 and a reader light sensor 210 for use in transmitting and receiving optical signals, respectively. The arrangement of the reader light source 208 and the reader light sensor 210 can vary depending on the device 202 with which the reader is configured to communicate. For example, the reader light source 208 and the reader light sensor 210 can be located on the side walls 164 on opposite sides of the slot 160. Alternatively, the reader light source 208 and the reader light sensor 210 can be located adjacent to each another on the same side wall 164.

A device 202 can be inserted into the second slot 160 in the body 154 so that a device light sensor 204 of the device 202 is adjacent to the reader light source 208 (e.g., a location from which the device light sensor 204 can sense light being emitted by the reader light source 208), and so that a device light source 206 of the device 202 is adjacent to the reader light sensor 210 (e.g., a location from which the reader light sensor 210 can sense light being emitted by the device light source 206). The device 202 can be coupled with the card reader 150 using, for example, a clip.

When inserted, the device light sensor 204 of the device 202 need not be in exact alignment with the reader light source 208. Similarly, the device light source 206 of the device 202 need not be in exact alignment with the reader light sensor 210. That is, the sensor on the card reader 150 is sufficiently far from the surface of the device 202 to accommodate some range of positions of the device light source 206 on the device 202 as well as some range of positions of the device light sensor 204 the device 202.

In some implementations, the card reader 150 includes a seal barrier, e.g., a rubber seal, along the edge of the second slot 160. When the card reader 150 is coupled with the device 202, the seal barrier can provide a firm grip and/or a light barrier from environmental light.

The device 202 can be a computing device, e.g., a handheld computing device, capable of running a user application. For example, the device 202 can be a mobile device, e.g., a smartphone or tablet computer. The device 202 is capable of running software that is configured to allow the device 202 to generate and transmit optical signals using the device light source 206, for example, to the reader light sensor 210. The software is also configured to allow the device 202 to interpret optical signals that are received by the device light sensor 204, for example, from reader light source 208.

In some implementations, the software is configured to allow the device 202 to use its display screen as a device light source. For example, the device 202 can display pixels of a particular color to generate a parallel data stream. The reader light sensor 210 of the card reader 150 can be configured to receive and interpret the pixels being displayed.

In some implementations, the software is configured to calibrate the device light source 206 of the device 202 with the reader light sensor 210. During the calibration process, the capabilities of the device light source 206 are demonstrated to the reader light sensor 210 to train the card reader 150 to recognize the different intensities of light the device light source 206 is capable of producing. The different light intensities can be used to generate optical signals.

Once the device 202 is inserted, the card reader 150 can communicate with the device 202 using the reader light source 208 and the reader light sensor 210. In particular, the card reader 150 can transmit data to the device 202 by encoding a digital output (e.g., a digital output representing currents that were generated in response to a card swipe) to an optical signal, as described above, and by transmitting, using the reader light source 208, the optical signal to the device light sensor 204 of the device 202. Similarly, the device 202 can transmit data to the card reader 150 by encoding a digital output to an optical signal, as described above, and by transmitting, using the device light source 206, the optical signal to the reader light sensor 210 of the card reader 150.

Figure 3:
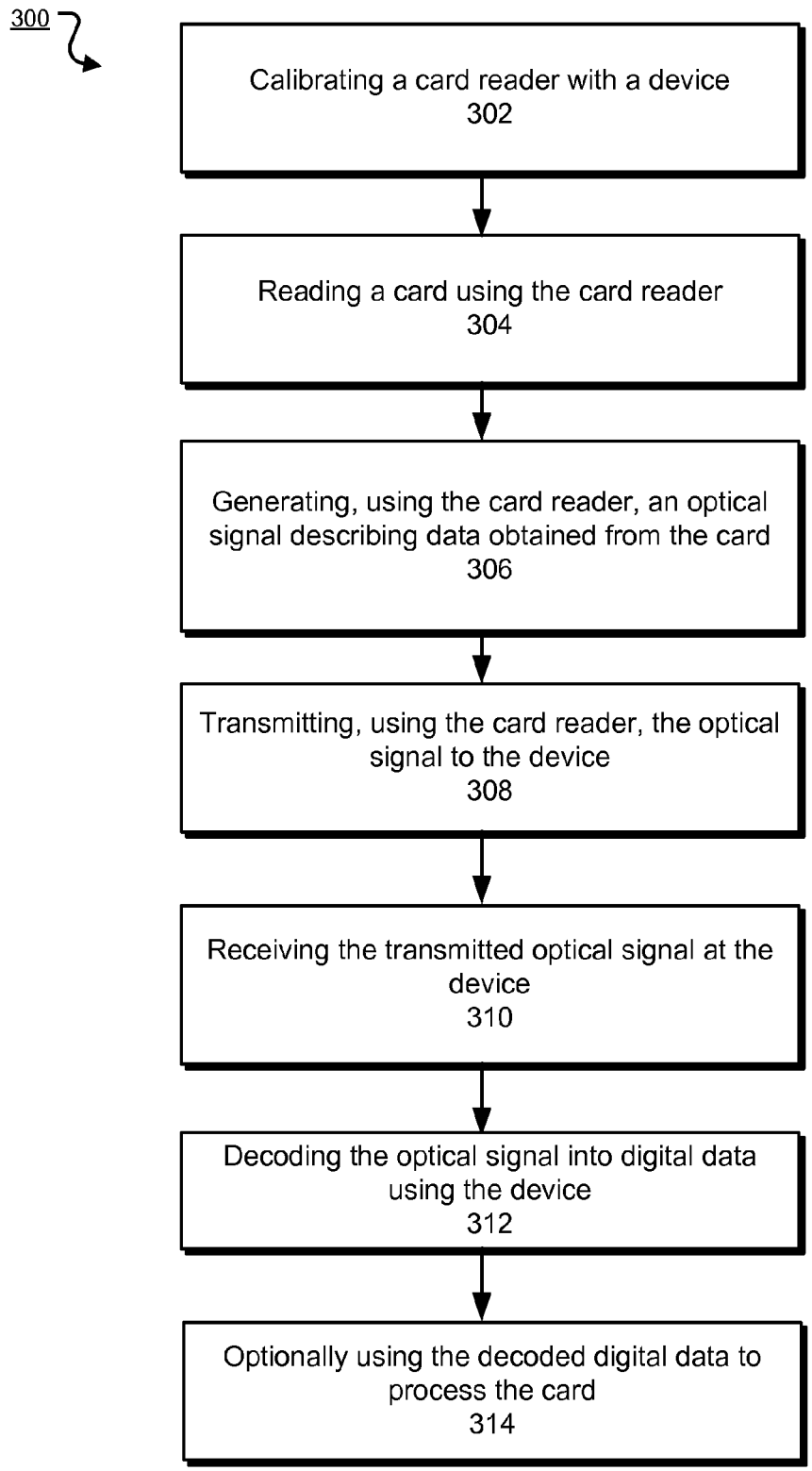
FIG. 3 is a diagram of an example flow chart of a process for communicating data between a card reader and a device using optical signals.

FIG. 3 is a diagram of an example flow chart of a process 300 for communicating data between a card reader and a device using optical signals. For convenience, the process 300 will be described as performed by a device, e.g., the device 202, and a card reader, e.g., the card reader 150, as described in reference to FIG. 2. The device and the card reader can be configured to transmit and receive optical signals to and from each other. In some implementations, this process is implemented through applications installed on the device and the card reader.

The device is calibrated with the card reader (302). In some implementations, before data is exchanged, the device is calibrated with the card reader. By calibrating with the card reader, the device is able to determine settings for transmitting and receiving optical signals.

In some implementations, the device calibrates a device light source with the card reader. Depending on the implementation, the device light source can be a camera flash or a light emitting diode (LED). Camera flashes and LEDs can vary in how they emit light depending on, for example, different modes of intensity with which they emit light. For example, one type of a camera flash can be limited to two modes: on or off. Other types of camera flashes can be dimmable with multiple modes (e.g., off, a low-intensity light mode, a medium-intensity light mode, and a high-intensity light mode). During calibration, the device is configured to teach to the card reader the different modes that the device light source is capable of performing. The device can use these different modes of the device light source to transmit optical signals. The calibration process trains the card reader to recognize the different modes so that they can be decoded accordingly.

When calibrating, the device can transmit an optical signal to the card reader to instruct the card reader to enter a calibration mode. The device can then demonstrate, to the card reader, the different modes using the device light source. The card reader can sense the different modes exhibited by the device light source using a reader light sensor. Depending on the implementation, the reader light sensor can be an ambient light sensor, which as the advantage of being able to sense changes in light at high speeds, or a camera. Once the different modes have been demonstrated, the card reader can store data describing the different modes for use in demodulating optical signals that are received from the device light source of the device.

Similarly, the card reader is also configured to calibrate a reader light source with the device. Thus, the card reader can demonstrate, to the device, different modes of intensity with which the reader light source can emit light. The device can store data describing the different modes for use in demodulating optical signals that are transmitted to and received from the card reader.

In some implementations the device calibrates a speed (e.g., baud rate) at which the device can transmit optical signals to the card reader. For example, the device can transmit a test optical signal to the card reader to instruct the card reader to enter a calibration mode. The device can then calibrate the baud rate by transmitting an optical signal to the card reader beginning at a slowest transmission speed and incrementing the transmission speed until transmission to the card reader fails. For example, when a transmission has failed, the card reader can be configured to transmit an optical signal to the device to notify the device of the failed transmission. Once a failed transmission is identified, the device can adjust the transmission speed to baud rate used to transmit the last successful transmission.

Similarly, the card reader calibrates a baud rate at which the card reader can transmit optical signals to the device. For example, the device can then calibrate the baud rate by transmitting an optical signal to the card reader beginning at a slowest transmission speed and incrementing the transmission speed until transmission to the device fails. For example, when a transmission has failed, the device can be configured to transmit an optical signal to the card reader to notify the card reader of the failed transmission. Once a failed transmission is identified, the card reader can adjust the transmission speed to baud rate used to transmit the last successful transmission.

The card reader reads data stored in a card (304). For example, the card reader can receive a swipe of a card and, upon swiping, can read data stored in the card, as described above.

The card reader generates an optical signal describing the data stored in the card (306). The card reader can convert the data read from the card into an optical signal, as described above in reference to FIG. 1A. In some implementations, the card reader and the device are configured to use one or more data ordering techniques when generating the optical signal to aid in the efficient transmission of optical signals. Data about card swipes may be ordered in specific ways to reduce latency for common outcomes. For example, on card swipe, the card reader may first transmit a summary of track decode outcomes (e.g., card failed swipe or card passed swipe) on each track, so a user interface can display the outcome (e.g., "failed swipe"), while other data is still being transmitted. Data ordering can be performed using well known data compression techniques. In some implementations, data ordering involves dividing the data into multiple transmitted packets, so the card reader does not need to wait for the entire data stream to be transmitted before decoding the optical signals.

The card reader transmits the optical signal to the device (308). The card reader can transmit the optical signal to the device by transmitting the optical signal through the reader light source, as described above. In some implementations, the card reader and the device are configured to use one or more data compression techniques to aid in the efficient transmission of optical signals. Data compression may be used to reduce the number of bits being transmitted, thus reducing transmission latency. Data compression can be performed using well known data compression techniques.

The device receives the optical signal from the card reader (310). The device light sensor of the device can receive the optical signal being transmitted from the card reader, as described above.

In some implementations, the device light sensor of the device is a camera. In such implementations, the camera captures a series of images of light pulses being emitted by the reader light sensor. The series of images are then evaluated to determine the optical signal. In such implementations, the speed at which the camera captures images can affect the rate at which data is transmitted from the card reader. To increase the transmission speed when using cameras that are slower at capturing images, the card reader can be configured to include multiple reader light sources (e.g., two, three, four, or more LEDs). Each of the multiple reader light sources can be configured so that an optical signal is transmitted in parallel to the device. The camera on the device can capture a series of images of light pulses being emitted by the multiple reader light sources. The series of images can then be evaluated to determine the optical signal.

In some implementations, the device light sensor of the device is an ambient light sensor. An ambient light sensor can detect transmissions of light, e.g., in a serial fashion at high speeds.

The device decodes the optical signal into digital data (312). The device can decode the received optical signal, for example, using the modulation techniques described above. In some implementations, the device and the card reader are configured to use error correction techniques for correcting errors in an optical signal. For example, the device or card reader may filter frequencies outside of the transmission range using well-known techniques. The raw demodulated bitstream may contain errors caused by random or systematic noise. These may be compensated for by standard forward error correction techniques, e.g., Hamming, BCH, Trellis codes, convolutional codes, Reed-Solomon, and LDPC.

The device uses the digital data to process the card (314). Once the optical signal has been decoded to digital data that describes data stored in the card, the device can use the digital data to process the swiped card. For example, the device can use the data to conduct a financial transaction (e.g., a credit card transaction) using the data stored in the card (e.g., a credit card number).

In some implementations, the device transmits an optical signal to the card reader to indicate whether the financial transaction using the card was successful. The device can transmit optical signals to the card reader using the process described above in reference to FIG. 3. For example, the device can generate an optical signal describing data indicating whether the financial transaction was successful. The device can transmit the optical signal to the card reader. The card reader can receive the transmitted optical signal and can decode the optical signal into digital data. Once decoding is complete, the card reader can perform additional operations based on whether the financial transaction was successful.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A card reader, comprising:
a body, the body being configured to be coupled to a device, the device including a device light sensor and a device light source;
a reader light sensor that is configured to communicate with the device light source, wherein, when the body is coupled to the device, the reader light sensor is positioned adjacent to the device light source;
a reader light source that is configured to communicate with the device light sensor, wherein, when the body is coupled to the device, the reader light source is positioned adjacent to the device light sensor, wherein the device light sensor is configured to decode an optical signal;
a reader interface positioned in the body and configured to read a magnetic stripe on a card as the card is swiped through a slot along the first axis that reads card data and generates a digital data signal, wherein the reader interface is positioned in the first slot; and
circuitry within the card reader configured to communicate data between the card reader and the device, wherein the circuitry is configured to decode the optical signal received using the reader light sensor into digital data, and wherein the circuitry within the card reader is configured to encode the digital data signal generated by the reader interface into an optical data signal and transmit the optical data signal from the reader light source;
wherein the body further comprises a second slot, and the reader light source and the reader light sensor are positioned within the second slot.

2. The reader of claim 1, wherein the device light sensor is an ambient light sensor or a camera.

3. The reader of claim 1, wherein the reader light sensor is an ambient light sensor or a camera.

4. The reader of claim 1, wherein the reader light source is a light emitting diode or a flash.

5. The reader of claim 1, wherein the body is coupled to the device using a clip.

6. A method for transmitting data from a card reader to a computing device comprising:
obtaining, using a reader interface positioned in a first slot of the card reader, data from a financial transaction card;
generating, using the reader interface of the card reader, a digital data signal that describes the data;
generating, using circuitry within the card reader, an optical signal by encoding the digital data signal;
transmitting, using a reader light source on the card reader, the optical signal as pulses of light to a device light sensor on the computing device, wherein the reader light source is positioned within a second slot of the card reader;
receiving the optical signal using the device light sensor of the computing device;
decoding, using the computing device, the optical signal received using the device light sensor into digital data; and
processing a financial transaction using the digital data.

7. The method of claim 6, further comprising:
calibrating the card reader with the computing device to determine at least one intensity of light for transmitting the optical signal.

8. A method for transmitting data between a computing device and a card reader comprising:
obtaining, using a reader interface positioned in a first slot of the card reader, data from a financial transaction card;
generating, using the reader interface of the card reader, a digital data signal that describes the data;
generating, using circuitry within the card reader, a first optical signal by encoding the digital data signal;
transmitting, using a reader light source on the card reader, the first optical signal as pulses of light to a device light sensor on the computing device, wherein the reader light source is positioned within a second slot of the card reader;
generating, using the computing device, a second optical signal that describes data;
transmitting, using a device light source on the computing device, the second optical signal to a reader light sensor on the card reader;
receiving the second optical signal using the reader light sensor of the card reader; and
decoding, using the card reader, the second optical signal into digital data.

9. The method of claim 8, further comprising:
calibrating the card reader with the computing device to determine at least one intensity of light for transmitting the first optical signal.

10. The reader of claim 1, further comprising a barrier covering at least the reader light source or the reader light sensor, the barrier preventing environmental light from entering the reader light source or the reader light sensor.

11. The reader of claim 1, wherein the device light source is a light emitting diode, a flash, or a portion of a display screen of the device.

12. The method of claim 7, wherein calibrating the reader further comprises:
determining a rate at which the reader light source is able to emit light and at which the device light sensor is able to detect the emitted light.

13. The method of claim 6, wherein the reader light source comprises a first light emitting diode and a second light emitting diode, and wherein transmitting, using the reader light source on the reader, the optical signal to the device light sensor further comprises:
transmitting the optical signal to the device light sensor using the first light emitting diode and the second light emitting diode, wherein each of the first light emitting diode and the second light emitting diode transmits a portion of the optical signal.

14. The method of claim 6, wherein the optical signal comprises one or more emissions of light, and wherein decoding, using the computing device, the optical signal into digital data further comprises:
capturing, using the device light sensor, one or more images of the one or more emissions of light, wherein the images are evaluated to determine the optical signal.

15. The method of claim 6, wherein decoding, using the computing device, the optical signal into digital card data further comprises:
applying, to the optical signal, one or more error correction techniques for correcting errors in the optical signal.

16. The method of claim 8, wherein generating, using the computing device, the second optical signal that describes data further comprises:
encoding the data using at least one modulation technique to produce the second optical signal.

17. The method of claim 8, wherein decoding, using the reader, the second optical signal into digital data further comprises:
applying, to the second optical signal, one or more error correction techniques for correcting errors in the second optical signal.

18. The method of claim 9, wherein calibrating the reader with the computing device further comprises:
determining a rate at which the device light source is able to emit light and at which the reader light sensor is able to detect the emitted light.

19. The method of claim 9, wherein the device light source is a camera flash, and wherein calibrating the reader with the computing device further comprises:
determining at least one flash mode supported by the device light source for transmitting the first optical signal.

20. The card reader of claim 1, wherein the second slot has a first sidewall and an opposing second sidewall, and the reader light source is positioned on the first sidewall, and the reader light sensor is positioned on the opposing second sidewall.

* * * * *